United States Patent
Marrazzo et al.

(10) Patent No.: US 6,349,984 B1
(45) Date of Patent: Feb. 26, 2002

(54) ILLUMINATED ACTIVATOR FOR AN INTERNAL VEHICLE TRUNK RELEASE MECHANISM

(76) Inventors: Diane Marrazzo; Anthony Marrazzo, both of 133 Paul Rd., Morrisville, PA (US) 19067

( * ) Notice: Subject to any disclaimer, the term of this patent is extended or adjusted under 35 U.S.C. 154(b) by 0 days.

(21) Appl. No.: 09/286,321

(22) Filed: Apr. 5, 1999

(51) Int. Cl.⁷ .................................................. E05B 3/00
(52) U.S. Cl. .......................... 292/336.3; 292/DIG. 43; 292/DIG. 65; 362/100; 200/314
(58) Field of Search .................. 292/336.3, 347, 292/DIG. 38, DIG. 43, DIG. 63, DIG. 65, DIG. 71, 216; 362/100, 84, 496, 501; 200/310, 313, 314, 56 R; 250/483.1; 340/425.5; D10/104, 106, 108, 109; D13/171, 158, 162, 168, 177; D18/27; D21/142

(56) References Cited

U.S. PATENT DOCUMENTS

| | | | |
|---|---|---|---|
| 1,431,821 A | * 10/1922 | Kotz | |
| 1,656,952 A | * 1/1928 | Nutt | |
| 1,762,447 A | * 6/1930 | Lowes | |
| 2,097,625 A | * 11/1937 | Langlotz | |
| 2,158,983 A | * 5/1939 | Knoll | 292/DIG. 37 |
| 2,682,251 A | * 6/1954 | Neugass | |
| 3,162,374 A | * 12/1964 | Skokut | |
| 3,860,771 A | * 1/1975 | Lynn | 200/5 |
| 4,057,794 A | * 11/1977 | Grossfield | 340/311 |
| 4,962,602 A | * 10/1990 | Meyrowitsch | 40/541 |
| 5,156,530 A | * 10/1992 | Rutschle | 417/234 |
| 5,297,010 A | * 3/1994 | Camarota | 362/80 |
| 5,445,326 A | * 8/1995 | Ferro | 292/336 |
| 5,580,153 A | * 12/1996 | Motz | 362/80 |
| 5,581,230 A | * 12/1996 | Barrett | 340/332 |
| 5,859,479 A | * 1/1999 | David | 307/10.8 |
| 6,086,131 A | * 7/2000 | Bingle | 296/76 |

FOREIGN PATENT DOCUMENTS

JP    10229509 A    * 8/1998

* cited by examiner

Primary Examiner—Gary Estremsky
(74) Attorney, Agent, or Firm—LaMorte & Associates

(57) ABSTRACT

A release mechanism for an automobile trunk that enables the trunk to be opened from within the trunk. The release mechanism contains an activation device that must be manually manipulated by a person within the trunk in order to activate the release mechanism and open the trunk. The activation device is illuminated. Accordingly, the activation device can be readily found and activated by a person locked within the trunk.

14 Claims, 4 Drawing Sheets

ILLUMINATED ACTIVATOR FOR AN INTERNAL VEHICLE TRUNK RELEASE MECHANISM

BACKGROUND OF THE INVENTION

1. Field of the Invention

In general, the present invention relates to release mechanisms for automobile trunks that enable the trunk to be opened from inside the trunk. More particularly, the present invention relates to the activation mechanism of such internal trunk release mechanisms.

2. Description of the Prior Art

Every year, many children accidently become locked in the trunk of an automobile. Unfortunately, some of these children die from suffocation, hypothermia or hyperthermia. In many modern automobiles, the automobile has a trunk latch that is operated by an electric solenoid. Such automobiles have buttons on their dashboards or in their glove box compartments that enable the trunk of that automobile to be opened without a key. Children playing in an automobile may accidently or purposely press the trunk release button and open the trunk of that automobile. Once the trunk is open, that child or another child can climb into the open trunk and pull the trunk closed. Once inside the trunk, the child becomes trapped and cannot escape until the trunk is again opened by another person.

Recognizing the hazards of the problem, numerous inventors and companies have engineered trunk latch mechanisms with safety releases. Accordingly, the prior art is replete with different types of trunk latching mechanisms that enable a person to open an automobile trunk from within the closed trunk.

When an automobile trunk is closed, the interior of the trunk is very dark. Accordingly, a child can easily become disoriented within a locked trunk. Such a child may not find the release mechanism within the trunk. If a child cannot find and/or use the release mechanism in the darkness of a closed trunk, then the release mechanism serves no useful purpose.

Internal trunk release mechanisms exist for the one time in a million that a person becomes locked in a trunk. This means that for most people, the internal trunk release mechanism will never be used. However, the trunk of an automobile is used thousands of times to hold a countless number of other objects. An internal trunk release mechanism must be accessible so that a child can find it in the dark. However, the internal trunk release mechanism cannot be so obtrusive that it interferes with the normal usage of the trunk. For example, many people put things in their trunks that are unsecured. This means that these objects move around in the trunk of the automobile as the automobile is in motion. A trunk release mechanism can not be positioned in a manner that enables a moving object to contact the trunk release mechanism and accidently open the trunk of the moving automobile.

A need therefore exists for an internal trunk release mechanism that can be readily located in the dark, readily operated by a small child yet is resistant to accidental activation. This need is met by the present invention as described and claimed below.

SUMMARY OF THE INVENTION

The present invention is an automobile trunk latch system. The system includes a latching mechanism that is selectively positionable between a locked condition and an open condition. The latching mechanism is opened either by a mechanical lever or an electric solenoid that is coupled to the latching mechanism, wherein the lever or solenoid is capable of selectively opening the latching mechanism. If the latching mechanism contains a solenoid, an illuminated switch is provided within the automobile trunk. The illuminated switch is electrically connected to the solenoid, wherein, when activated, the illuminated switch causes the solenoid to open the latching mechanism.

If the latching mechanism is operated by a mechanical lever, the handle of the lever is made to be illuminated. The handle can be either internally illuminated or photoluminescent. As such, the latching mechanism can be easily identified and operated in a dark locked trunk.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
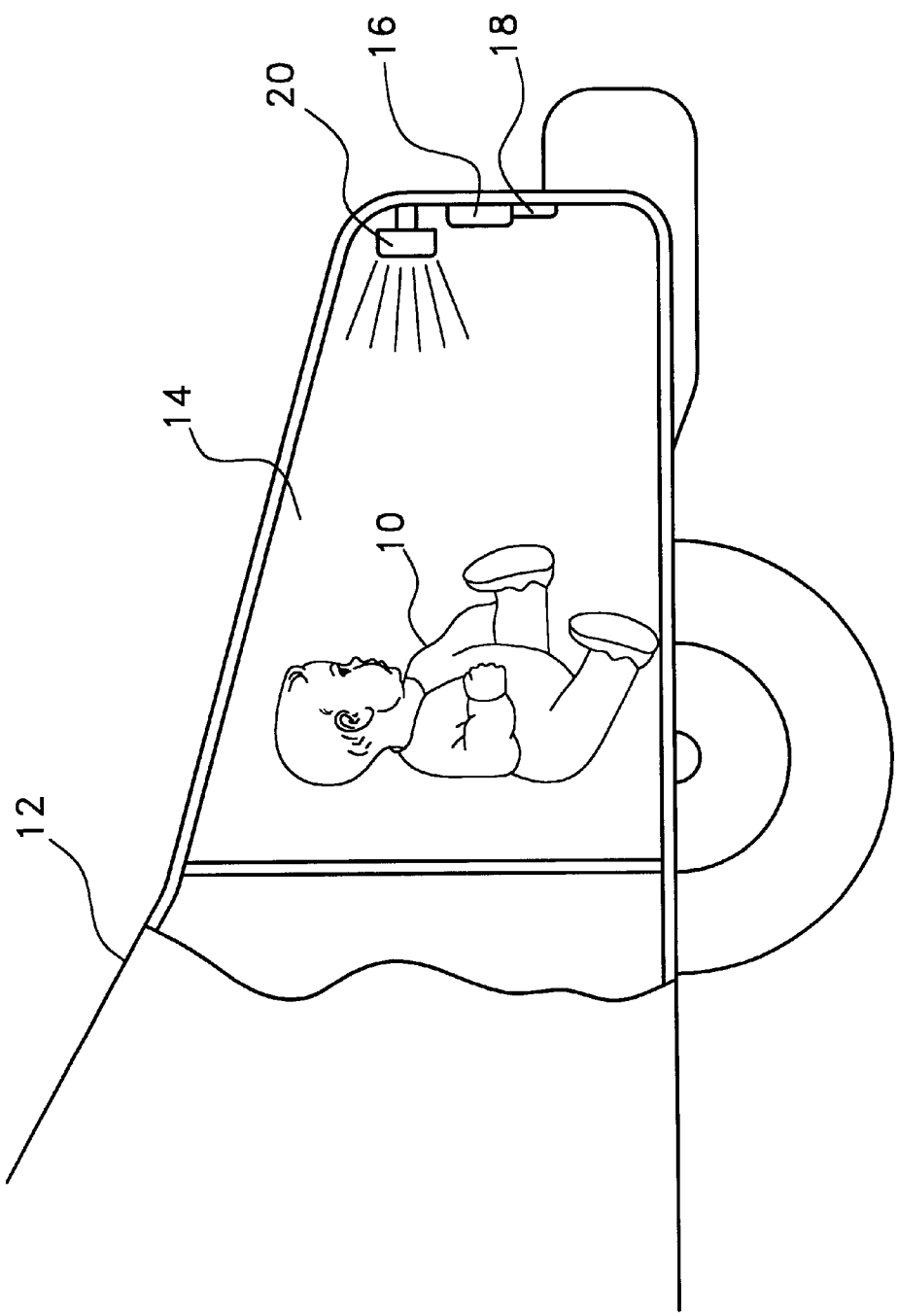
FIG. 1 is a fragmented view of a child locked in the trunk of an automobile that is equipped with the present invention internal trunk release mechanism.

The present invention is an improved trunk release mechanism that enables a small child within a locked automobile trunk to open the trunk latch. Referring to FIG. 1, a child 10 is shown locked within the trunk 14 of an automobile 12. On a hot summer day, such a child could die in as quickly as ten minutes if the trunk is not opened.

The trunk 14 is locked closed by a trunk latch mechanism 16. As is typical with many modern automobiles, the trunk latch mechanism 16 contains an electrical solenoid 18 that opens the trunk latch mechanism 16 when activated. This enables the trunk latch mechanism 16 to be opened remotely by a switch in the passenger cabin of the automobile 12 or by a hand held remote keyless entry device.

The present invention is an improved internal trunk release mechanism. The improved internal trunk release mechanism includes a large activation button 20 that faces the interior of the trunk 14. The activation button 20 is illuminated. Accordingly, when a child 10 is locked in a dark automobile trunk 14, the large illuminated activation button 20 becomes the immediate focus of attention. The illuminated activation button 20 serves two purposes. Primarily, the purpose of the illuminated activation button 20 is to draw the child's attention so that the child 10 will touch the illuminated activation button 20 and open the trunk latch mechanism 16. Secondly, the large illuminated activation button 20 provides a small degree of illumination to the interior of the trunk 14. Accordingly, a child 10 will not become frightened from being trapped in the dark. As such, the child 10 is less likely to panic and cry. With the light provided by the illuminated activation button 20, a child 10 can see his/her surroundings and can readily move himself/herself close enough to the activation button 20 to touch the activation button 20. A child 10 locked in the trunk 14 of an automobile is therefore not required to feel around in the dark for a way to escape.

The illuminated activation button 20 is coupled to the circuitry of the electric solenoid 18 within the trunk latch mechanism 16. Accordingly, as soon as the activation button 20 is contacted, the trunk latch solenoid 18 is activated and the trunk 14 of the automobile opens.

Figure 2:
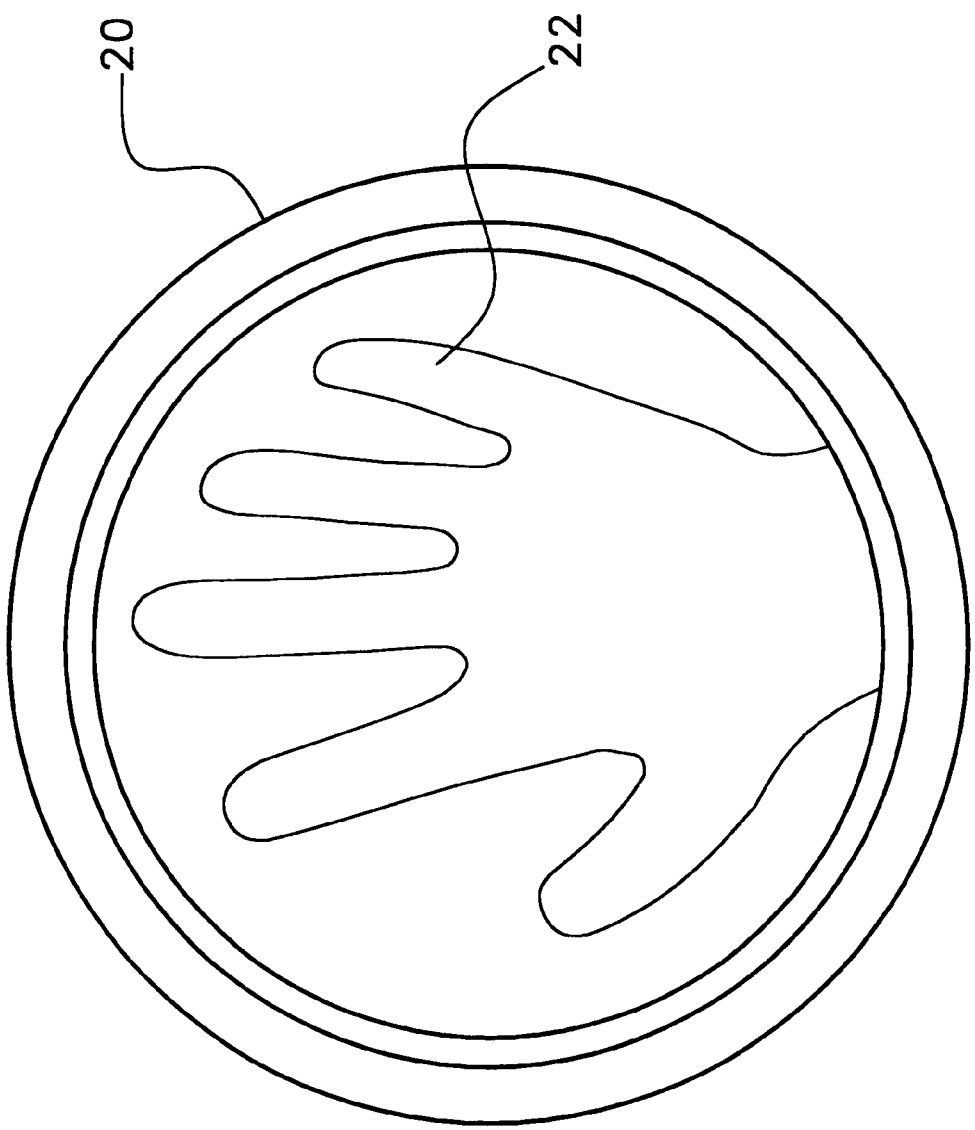
FIG. 2 is a front view of one preferred embodiment of an illuminated activation button in accordance with the present invention.

An illuminated activation button 20, in an otherwise dark trunk 14, would attract the attention of a child 10. However, a child 10 may not know that they should touch the illuminated activation button 20 to escape from the trunk 14. Referring to FIG. 2, it will be understood that to help induce a child to touch the illuminated activation button 20, an indicia 22 can be printed on the face of the button 20. The indicia 22 can be any image that is determined to prompt a small child to touch that indicia 22. For example, the indicia could be a smiling face. However, in the shown embodiment, the indicia 22 is the image of a hand. A child sitting in the darkness of a locked trunk would be induced to place his/her hand against the illuminated image of the hand, thereby opening the trunk.

Figure 3:
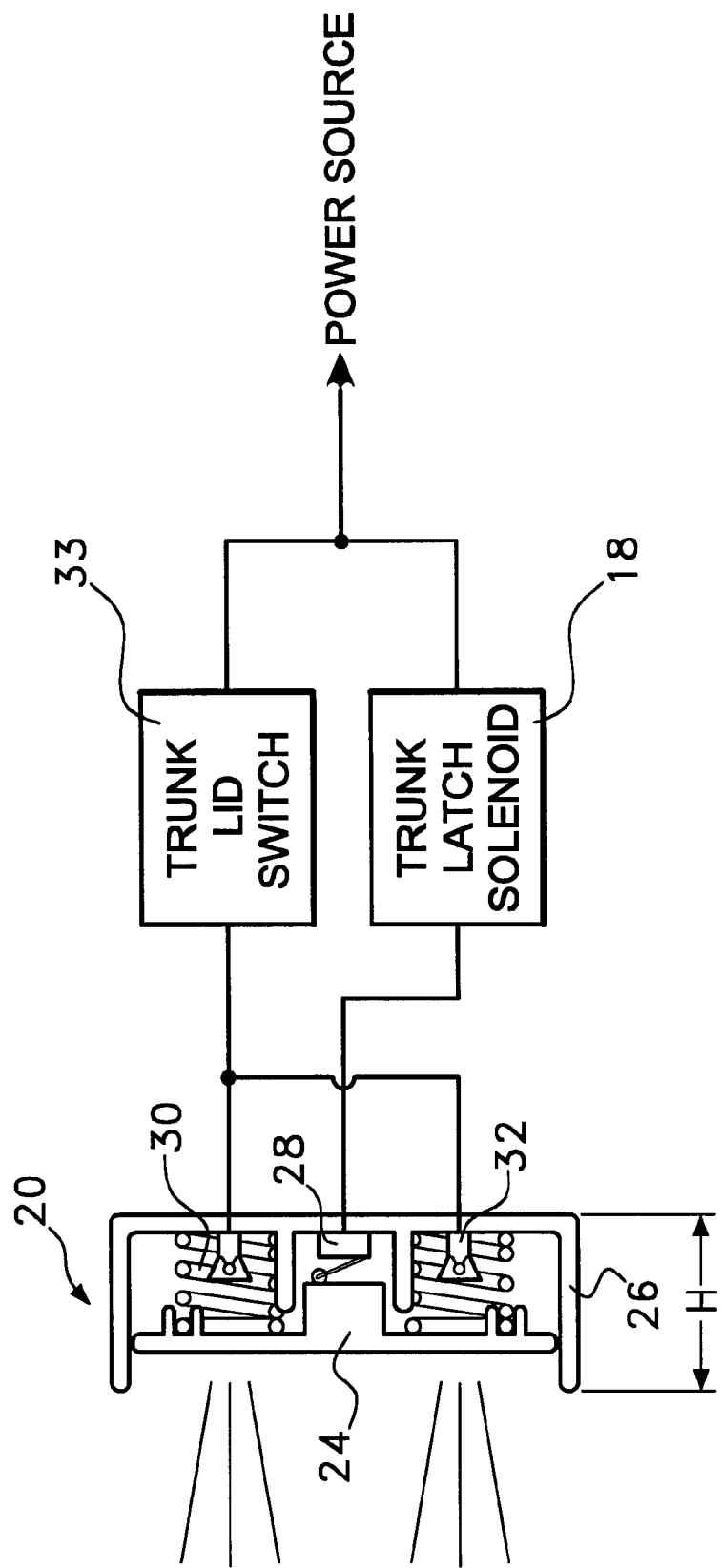
FIG. 3 is a schematic of an embodiment of the present invention.

A large button in the trunk of an automobile can be inadvertently contacted by objects in the trunk that move around as the car is in motion. To prevent the trunk from inadvertently opening, the illuminated activation button is configured to resist inadvertent contact. Referring to FIG. 3, it can be seen that the illuminated activation button 20 is comprised of a main contact plate 24 that is recessed within a protective housing 26. The protective housing 26 is cylindrical in shape, thereby defining an external wall with a height H. The main contact plate 24 is set inside the protective housing 26 a predetermined distance from the edge of the protective housing 26. As such, should an object fall against the illuminated activation button 20 within the trunk, that object would most likely fall across the edge of the protective housing 26 and would not contact the main contact plate 24. Accordingly, the inadvertent contact would not trigger the opening of the automobile trunk.

In FIG. 3, it can be seen that the main contact plate 24 is held above an electrical switch 28 by a spring 30. When the main contact plate 24 is depressed against the bias of the spring 30, the main contact plate 24 activates the electrical switch 28. The electrical switch 28 is coupled to the electrical solenoid 18 within the trunk latch mechanism. When the electrical switch 28 is triggered, the electrical solenoid 18 is activated and the automobile trunk opens.

The illumination sources 32 within the activation button 20 and the electrical solenoid 18 are both connected to the power supply wiring of the automobile. The illumination sources 32 are coupled to the trunk lid switch 33, which is used to activate the courtesy light in the trunk. Accordingly, the illumination sources 32 are only lit when the trunk is closed. Accordingly, the activation button 20 will remain illuminated and functional for as long as there is power in the battery of the automobile. The illumination sources 32 within the activation button 20 can be incandescent bulbs. However, to prevent a drain on the automobile's battery, the illumination sources 32 are preferably low power light emitting diodes or other low power light sources.

As has been previously mentioned, many prior art trunk latch mechanisms contain electric solenoids that control their operation. The illuminated activation button can be retroactively added to many of these prior art systems. Alternatively, the illuminated activation button can be manufactured as part of a new trunk latch mechanism.

However, not all automobiles have trunk latches that are activated by electrical solenoids. Rather, many automobiles have mechanical trunk latches that can only be activated by the physical turning of a key. The prior art contains many different types of internal release mechanisms for such trunk latches. These trunk latches are commonly opened by the pushing or pulling of a mechanical lever. With such prior art release mechanisms, a child must locate the handle in the darkness of the trunk and have the knowledge to turn or push that lever in a certain direction in order to open the trunk.

Figure 4:
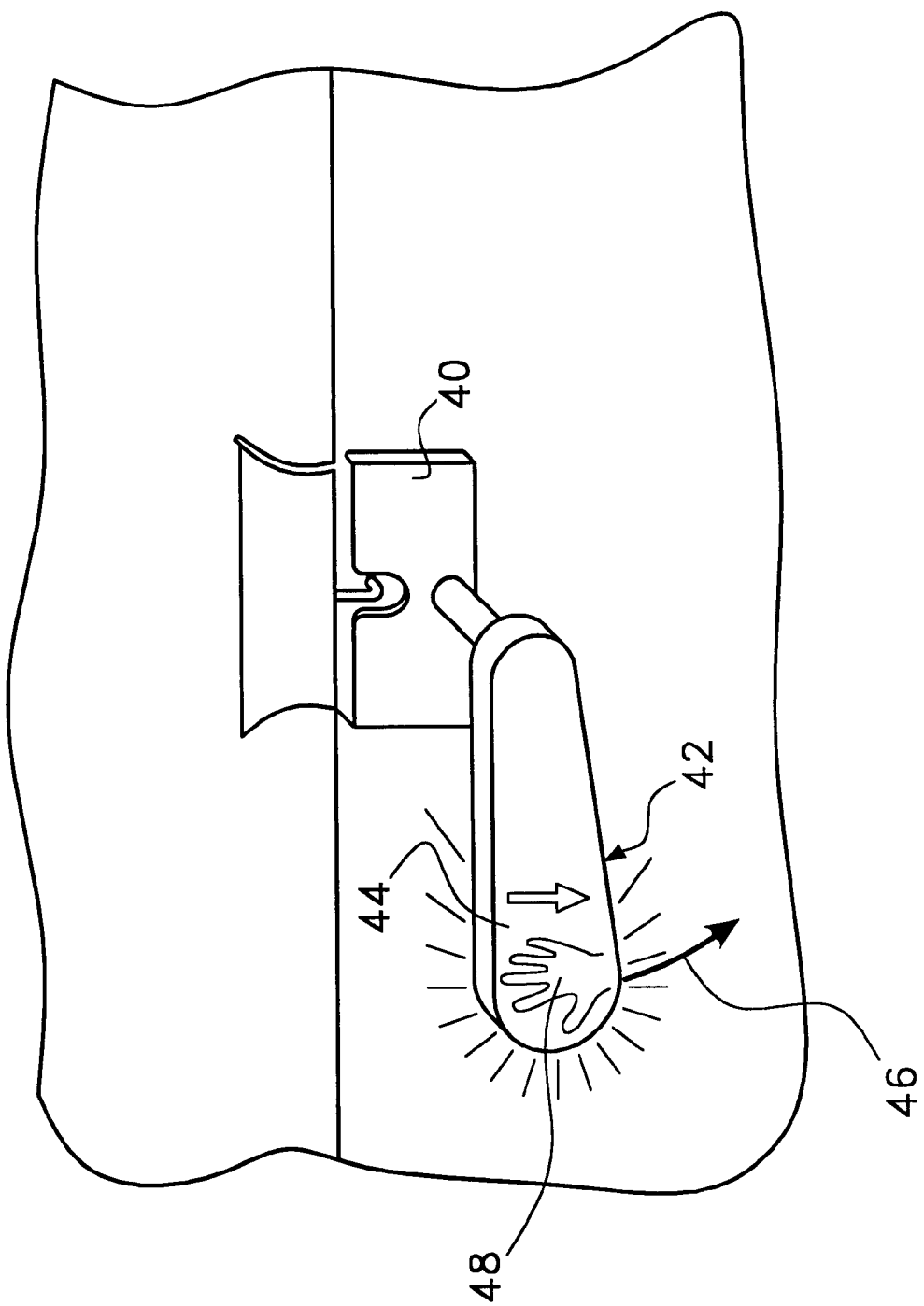
FIG. 4 is a front view of an alternate embodiment of the present invention.

Referring to FIG. 4, an alternate embodiment of the present invention is shown. The shown embodiment is a mechanical system containing a trunk latch mechanism 40 and an activation lever 42 that is used to open the trunk latch from within the automobile trunk. The activation lever 42 is operated by turning the handle 44 of the activation lever 42 in the direction of arrow 46.

In the shown embodiment, the activation lever 42 is fabricated from a photoluminescent plastic. Photoluminescent plastics (i.e. glow-in-the-dark plastics) act as photocapacitors. The plastic absorbs light energy and slowly releases that light energy over time. Most automobile trunks have courtesy lights that light when the trunk lid is lifted. Even though the courtesy light may be lit for only a short time, the light energy from the courtesy light will be absorbed by the photoluminescent plastic of the handle 44. Accordingly, once the trunk is closed, the activation lever will glow for at least several minutes. The length of time that the activation lever 42 will glow depends upon the composition of the photoluminescent plastic, the mass of the plastic and the amount of light energy absorbed by the plastic.

A guidance indicia 48 can be present on the activation handle 44. The guidance indicia 48 can be anything that would entice a child to touch the handle 44 and move that handle 44 in the proper direction.

It will be understood that the various figures described above illustrate only two embodiments of the present invention. A person skilled in the art can make numerous alterations and modifications to the shown embodiments utilizing functionally equivalent components to those shown and described. All such modifications are intended to be included within the scope of the present invention as defined by the appended claims.

What is claimed is:

1. In an automobile having a trunk, an automobile trunk latch system for opening the trunk from within the trunk, comprising:

a latching mechanism that is selectively positionable between a locked condition and an open condition;

an electric solenoid coupled to said latching mechanism, wherein said solenoid is capable of selectively altering said latching mechanism between said locked condition and said open condition;

a push button within the automobile trunk, said push button having a face surface that is light emitting and an indicia that is disposed on said face surface, said push button remaining lit within the trunk when the trunk is closed, said push button being electrically connected to said solenoid, wherein, when activated, said push button causes said solenoid to change said latching mechanism into said open condition.

2. The system according to claim 1, wherein said push button has a face surface that is light emitting and an indicia is disposed on said face surface.

3. The system according to claim 1, wherein said indicia is the image of a hand.

4. The system according to claim 1, further including a protective housing that surrounds said push button, thereby preventing said push button from being inadvertently activated from within the trunk.

5. The system according to claim 4, wherein said push button has a peripheral edge and said protective housing includes a cylindrical wall that surrounds said peripheral edge and extends a predetermined distance past said push button.

6. In an automobile having a trunk and a trunk latch that locks the trunk closed, an assembly comprising:

a release mechanism located within the trunk for opening the trunk latch;

a push button that must be manually pressed to activate said release mechanism, wherein said push button emits light into the trunk when the trunk is locked closed and;

a protective housing that surrounds said push button, thereby preventing said Push button from being inadvertently activated from within the trunk.

7. The assembly according to claim 6, wherein the trunk latch contains an electrical solenoid that opens the trunk latch when activated, and said push button is an electrical switch coupled to the electrical solenoid that selectively activates the electrical solenoid.

8. The assembly according to claim 6, wherein said push button has a face surface that is illuminated from within the push button and an indicia is disposed on said face surface.

9. The assembly according to claim 8, wherein said indicia is the image of a hand.

10. The assembly mechanism according to claim 6, wherein push button has a peripheral edge and said protective housing includes a cylindrical wall that surrounds said peripheral edge and extends a predetermined distance past said push button.

11. A method, compromising the steps of:

providing a release mechanism within an automobile trunk that has an activation device, wherein said release mechanism opens the automobile trunk when said activation device is manually manipulated from within the auotomobile trunk;

internally illuminating said activation device within the automobile trunk so that said activation device emits light when the automobile trunk is closed; and providing an indicia on said activation devices to entice a child to manually manipulate said activation device.

12. The method according to claim 11, wherein said step of illuminating said activation device includes providing electric light sources within said activation device.

13. The method according to claim 11 wherein said step of illuminating said activation device includes forming at least a portion of said activation device from a photoluminescent material.

14. The method according to claim 11, wherein said indicia is an image of a hand.

\* \* \* \* \*